(No Model.)
W. J. WOODCOCK.
FRICTION CLUTCH.
No. 443,694. Patented Dec. 30, 1890.
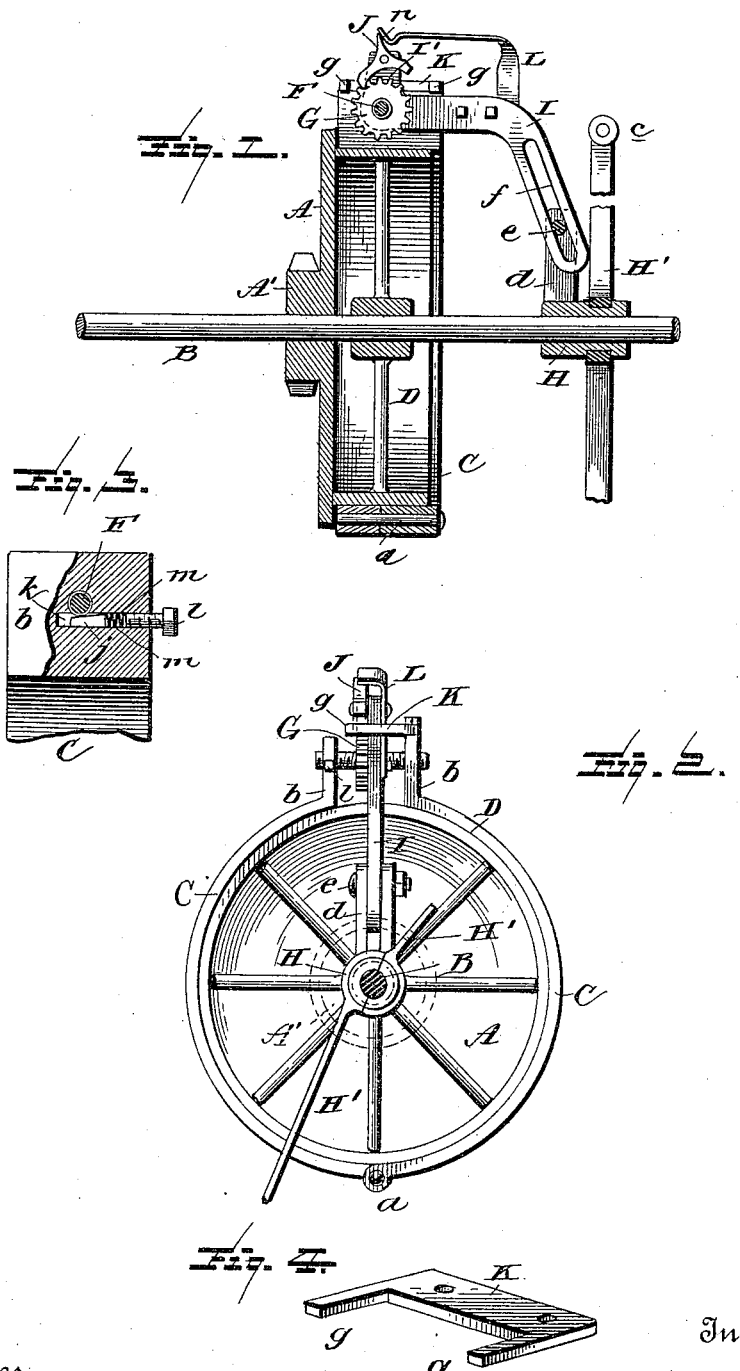
Witnesses
L. C. Hills
E. H. Bond
Inventor
Willard J. Woodcock
E. B. Stocking
Attorney

UNITED STATES PATENT OFFICE.

WILLARD J. WOODCOCK, OF AUBURN, NEW YORK.

FRICTION-CLUTCH.

SPECIFICATION forming part of Letters Patent No. 443,694, dated December 30, 1890.

Application filed May 5, 1890. Serial No. 350,641. (No model.)

*To all whom it may concern:*

Be it known that I, WILLARD J. WOODCOCK, a citizen of the United States, residing at Auburn, in the county of Cayuga, State of New York, have invented certain new and useful Improvements in Friction-Clutches, of which the following is a specification, reference being had therein to the accompanying drawings.

This invention relates to certain new and useful improvements in friction-clutches; and it has for its object, among others, to provide an improved device of this character wherein I obtain a continuous movement on the screws or other devices connecting the portions of the friction-band whether running or not in motion. I also am enabled to get any amount of pressure desired on the friction-pulley, or I can get any amount of release, avoiding the necessity of taking up any slack or making any adjustments with a wrench. Ordinarily there is provision for but one thrust of the lever forward to tighten the clamps, and if there is not power enough received from the clutch the lever has to be drawn back and the clutch adjusted with a hand-wrench. By my construction the power does not have to be stopped. If it slips after the first thrust of the lever, all that is necessary to do is to give the lever two or more thrusts. Every time the lever is moved the screw or other device employed to tighten the friction-band is tightened. In all prior constructions with which I am familiar when the parts are adjusted to give the required power they cannot be released enough to prevent the clamps and pulley from cutting, whereas by my construction all the release desired is obtained. I make my clutch sectional. I provide means for preventing the screw from working back when the pawl is worked after the thread in the nuts are worn a little. I simplify and cheapen the construction in general and render it more efficient and satisfactory in action.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a central section through a device embodying my improvements, parts being shown in side elevation. Fig. 2 is an end view with the shaft in section. Fig. 3 is a detail on a large scale with parts broken away and others in section, showing the means for compensating for wear and preventing turning back of the screw. Fig. 4 is an enlarged perspective view of the stop-plate removed.

Like letters of reference indicate like parts throughout the several views.

Referring now to the details of the drawings by letter, A designates a face plate or disk having cast integral therewith the sprocket-wheel A', as shown best in Fig. 1.

B is the shaft.

C are friction bands or clamps made fast to the face plate or disk in any suitable manner at $a$, upon which they are hinged or pivoted, the connection being shown best in Fig. 1, where the two bands or clamps are shown as halved out or otherwise formed and having enlargements to receive the pin $a$, which serves also as the pivot on which they work.

D is the pulley fast on the shaft B. This pulley as well as the face plate or disk, and consequently the sprocket-wheel, are formed in halves secured together in any well-known or desirable way. This facilitates their being readily applied to the shaft or removal for the purpose of repairs or other purposes.

The adjacent free ends of the friction bands or clamps are formed with lugs $b$, as seen best in Fig. 2, which extend substantially parallel with each other, and in which is tapped the right and left screw F, adapted to draw together or separate the free ends of the friction bands or clamps to increase or decrease the friction thereof on the pulley, as occasion may require.

G is a gear-wheel on the screw F, and H is a sleeve formed in sections or halves and adapted to slide upon the shaft B, being provided with a lever H', pivoted at $c$ to any fixed support and provided with an arm $d$, moving with said sleeve and carrying a lateral pin or roller $e$, as seen in Fig. 1.

I is a curved lever, one arm of which has a longitudinal slot $f$, in which the pin $e$ works, as seen in Fig. 1, and the opposite end of the other arm carries a pawl J, having two teeth, as shown, and adapted to engage the gear-wheel G. This lever, oscillated on the screwed spindle F and the upright portion I', on which the pawl is pivoted, works between a stop-plate K, secured on the top of one of the lugs $b$ of the friction bands or clamps, said plate having two stop pins or fingers $g$.

L is a spring secured to the lever I and arranged to act with its free end upon the pawl J to hold the same in operative position in contact with the teeth of the gear-wheel. This pawl is reversible by pulling the lever H' back so far as it will go until the pawl strikes one of the pins on the stop-plate.

The operation of the lever H' through the medium of the means above described moves the screw F in one direction or the other, according to the direction in which the lever is moved, and tightens or releases the clamps, and as the clamps are tightened motion is imparted to the sprocket-wheel, from which power may be transmitted to the desired source in any suitable manner.

In lieu of the sprocket-wheel a belt-pulley may be employed without departing from the spirit of the invention or detracting from the merit of the other features thereof.

It will be readily seen from the above that I can get a continuous movement of the screws and can get any amount of pressure desired or any amount of release.

I have shown the friction bands or clamps arranged upon the outside of the pulley, as this is the preferred way; but they may be readily applied upon the inner periphery thereof, if desired, and where in the following claims I refer to the bands or clamps as applied to the periphery of the pulley I wish to be understood as covering the same whether upon the outside or inside.

In order to keep the screw from working back when the pawl is worked after the threads in the nuts are worn a little, I have provided the following device, which in practice has proved most efficient: It is shown in Fig. 3, to which special attention is called. In this figure the screwed spindle F is shown in section, and the lug $b$ of the friction-band C broken away to better illustrate the device, which consists of a wedge-shaped plug $j$, arranged beneath the screwed spindle F and adapted to be moved endwise in a groove $k$ in the lug $b$, and designed to be thus moved by the set-screw $l$, between which and the plug is arranged a spring $m$. As the parts wear the plug is pushed in and the screw thus prevented from working back, as will be readily understood. The free end of the spring L is formed with a bend $n$, as seen in Fig. 1, to adapt it for its work, no matter which way the pawl is arranged to act.

The above constitutes what at present I consider the preferable way of carrying out my invention; but the same is capable of various modifications in details of construction without departing from the spirit of the invention or detracting from its merits.

What I claim as new is—

1. The combination, with a pulley and friction-clamps arranged to act upon the periphery thereof, of a screw connecting the free ends of the clamps, a lever oscillating on the screw, and means for actuating the lever, substantially as specified.

2. The combination, with a pulley and friction-clamps arranged to act upon the periphery thereof, of a screwed spindle connecting the free ends of the clamps, an oscillating lever oscillating on the spindle, means for actuating the lever, and means on the lever for imparting a continuous movement to the screw, substantially as and for the purpose specified.

3. The combination, with the pulley and the friction-clamps, of the screw connecting the free ends of the clamps, the lever oscillating on the screw, the gear-wheel on the screw, means for oscillating the lever, and a pawl carried by the lever and adapted to engage the gear-wheel, substantially as and for the purpose specified.

4. The combination, with the clamps and the screw, of a device for preventing backward movement of the screw in case of wear, as set forth.

5. The combination, with the clamp and the screw, of a tapered plug arranged to act against the screw, and means for adjusting the plug, as and for the purpose specified.

6. The combination, with the clamps and the screw, of a tapered plug arranged to act against the screw, a set-screw for adjusting the plug, and a spring arranged between the set-screw and the plug, substantially as and for the purpose specified.

7. The combination, with the pulley and the friction-clamps, of the screw connnecting the free ends of the clamps, the lever oscillating on the screw, means for actuating the lever, the gear-wheel on the screw, the pawl carried by the lever, and a spring arranged to act upon the pawl in either position the latter may be acting, as set forth.

8. The combination, with the shaft, the pulley fast thereon, the friction-clamps, and the screw connecting the free ends thereof, of the lever oscillating on the screw and having a slotted portion, the sleeve free to be moved on the shaft and having a portion engaging the slot of the lever, the pawl carried by the lever, and intervening mechanism whereby the oscillation of the lever is caused to impart a continuous movement to the screw, substantially as and for the purpose specified.

9. The combination, with the shaft, the pulley fast thereon, and the friction-clamps, of the screw connecting the free ends of the clamps, the lever oscillating on the screw, means for oscillating the lever, and a reversible pawl carried by the lever, substantially as specified.

10. The combination, with the shaft, the pulley fast thereon, and the friction-clamps arranged to act upon the periphery of the pulley, of the screw connecting the free ends of the clamps, the lever oscillating on the screw, means for oscillating the lever, the pawl on the lever arranged to actuate the screw, and the stop-plate between which the pawl works, substantially as specified.

In testimony whereof I affix my signature in presence of two witnesses.

WILLARD J. WOODCOCK.

Witnesses:
ROBERT STOPPARD,
NORMAN L. SMITH.